United States Patent
Porter et al.

(10) Patent No.: US 11,021,976 B2
(45) Date of Patent: Jun. 1, 2021

(54) HARDWARE GEOMETRY FOR INCREASING PART OVERLAP AND MAINTAINING CLEARANCE

(71) Applicant: United Technologies Corporation, Hartford, CT (US)

(72) Inventors: Steven D. Porter, Wethersfield, CT (US); John T. Ols, Northborough, MA (US); Kyle C. Lana, Portland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 535 days.

(21) Appl. No.: 14/862,351

(22) Filed: Sep. 23, 2015

(65) Prior Publication Data

US 2016/0177755 A1 Jun. 23, 2016

Related U.S. Application Data

(60) Provisional application No. 62/095,374, filed on Dec. 22, 2014.

(51) Int. Cl.
*F01D 9/02* (2006.01)
*F01D 1/04* (2006.01)
*F01D 11/00* (2006.01)
*F01D 5/08* (2006.01)

(52) U.S. Cl.
CPC .............. *F01D 9/02* (2013.01); *F01D 1/04* (2013.01); *F01D 5/081* (2013.01); *F01D 11/001* (2013.01); *F05D 2240/80* (2013.01); *Y02T 50/60* (2013.01)

(58) Field of Classification Search
CPC ........ F01D 11/001; F01D 11/02; F01D 11/04; F01D 9/02; F01D 1/04; F01D 5/081; F05D 2240/80
See application file for complete search history.

(56) References Cited

U.S. PATENT DOCUMENTS

| 3,609,057 A * | 9/1971 | Radtke .............. F01D 5/081 |
| | | 415/115 |
| 6,290,464 B1 * | 9/2001 | Negulescu .......... F01D 1/32 |
| | | 416/239 |
| 7,234,918 B2 * | 6/2007 | Brillert ............ F01D 11/001 |
| | | 415/173.5 |
| 2004/0086379 A1 | 5/2004 | Farrell et al. |

(Continued)

FOREIGN PATENT DOCUMENTS

| EP | 2599966 | 6/2013 |
| EP | 2759676 | 7/2014 |
| JP | 07259505 A * | 10/1995 ............ F01D 11/001 |

OTHER PUBLICATIONS

J-PlatPat. JP,07-259505,A Detailed Description, retrieved Nov. 8, 2018.*

(Continued)

Primary Examiner — Michael Lebentritt
Assistant Examiner — Jesse M Prager
(74) Attorney, Agent, or Firm — Snell & Wilmer L.L.P.

(57) ABSTRACT

A gas-turbine engine is provided. The gas-turbine engine comprises a high pressure turbine with an aft blade platform. A static structure may be disposed aft of the high pressure turbine and proximate a cavity defined by the aft blade platform. A vane of the static structure may have a vane platform with a shaped tip extending into the cavity.

13 Claims, 5 Drawing Sheets

(56) References Cited

U.S. PATENT DOCUMENTS

| | | | |
|---|---|---|---|
| 2006/0024166 A1* | 2/2006 | Whitton | F01D 5/187 416/219 R |
| 2006/0275107 A1* | 12/2006 | Alvanos | F01D 5/085 415/110 |
| 2009/0028712 A1* | 1/2009 | Weidmann | F01D 5/3007 416/220 R |
| 2009/0067997 A1* | 3/2009 | Wu | F01D 11/001 415/173.7 |
| 2011/0070072 A1* | 3/2011 | Subramaniyan | F01D 5/225 415/173.2 |
| 2011/0156359 A1* | 6/2011 | Zheng | F01D 11/001 277/418 |
| 2012/0034072 A1* | 2/2012 | Bagnall | F01D 11/001 415/170.1 |
| 2014/0119879 A1* | 5/2014 | Jha | F01D 11/001 415/1 |

OTHER PUBLICATIONS

Extended European Search Report dated May 24, 2016 in European Application No. 15201381.9.
European Patent Office, European Office Action dated Feb. 28, 2018 in Application No. 15 201 381.9-1006.
European Patent Office, European Search Report dated Oct. 5, 2018 in Application No. 15 201 381.9-1006.

* cited by examiner

HARDWARE GEOMETRY FOR INCREASING PART OVERLAP AND MAINTAINING CLEARANCE

CROSS-REFERENCE TO RELATED APPLICATIONS

This application is a nonprovisional of, and claims priority to, and the benefit of U.S. Provisional Application No. 62/095,374, entitled "HARDWARE GEOMETRY FOR INCREASING PART OVERLAP AND MAINTAINING CLEARANCE," filed on Dec. 22, 2014, which is hereby incorporated by reference in its entirety.

FIELD

The present disclosure relates to gas-turbine engines, and, more specifically, to an interface between a blade platform and a mid-turbine frame to increase radial overlap while maintaining clearance between rotating and static components.

BACKGROUND

Gas-turbine engines frequently implement seals or other interfaces between rotating components and static components. In some instances, the interfaces may be limited by a desired safe distance between the rotating and static components. The distance between the static components and rotating components may change during engine operation. The varying relative positions of static and rotating components may limit how close a static component may be to a rotating component while maintaining a distance that may reduce the likelihood of contact. In that regard, overlap between rotating components, such as rotor disks and blade platforms, and static components, such as mid-turbine frames, may be limited by safety constraints.

SUMMARY

A gas-turbine engine is provided. The gas-turbine engine comprises a high pressure turbine with an aft blade platform. A static structure may be disposed aft of the high pressure turbine and proximate a cavity defined by the aft blade platform. A vane of the static structure may have a vane platform with a shaped tip extending into the cavity.

In various embodiments, the shaped tip may comprise a chamfered contour. A chamfered contour may refer to a beveled edge that connects two surfaces. In that regard, a beveled edge may refer to an edge that is not perpendicular to a surface of a component. A distal surface of the shaped tip can be oriented at an angle relative to a proximate surface of the vane platform. The angle may be between 13 and 17 degrees. A length of the distal surface may be between 0.060 and 0.070 inches. A proximal surface of the shaped tip may be disposed at an angle relative to a proximate surface of the vane platform. The angle may be between 8 and 12 degrees. A length of the proximal surface may be between 0.070 inches and 0.080 inches. The shaped tip may have a radial contour. A contour of the shaped tip may be configured to maintain a distance from the cavity.

A static structure is also provided comprising an airfoil and a vane platform extending from the airfoil. The vane platform may include a shaped tip.

In various embodiments, the shaped tip may have a chamfered contour. A surface of the chamfered contour may be disposed at an angle relative to a proximate surface of the vane platform. The angle may be between 13 and 17 degrees. A length of the surface may be between 0.060 inches and 0.070 inches. A length of the surface may also be between 0.070 and 0.080 inches. The shaped tip may comprise a radial contour.

A turbine section is further provided. The turbine section may comprise a high pressure turbine with an aft blade platform configured to rotate about an axis, a static structure aft of the high pressure turbine and proximate a cavity defined by the aft blade platform, and a vane platform of the static structure having a shaped tip extending into the cavity.

In various embodiments, the shaped tip may comprise a chamfered contour. A surface of the chamfered contour may be disposed at an angle with a proximate surface of the vane platform. The angle may be between 10 and 20 degrees.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
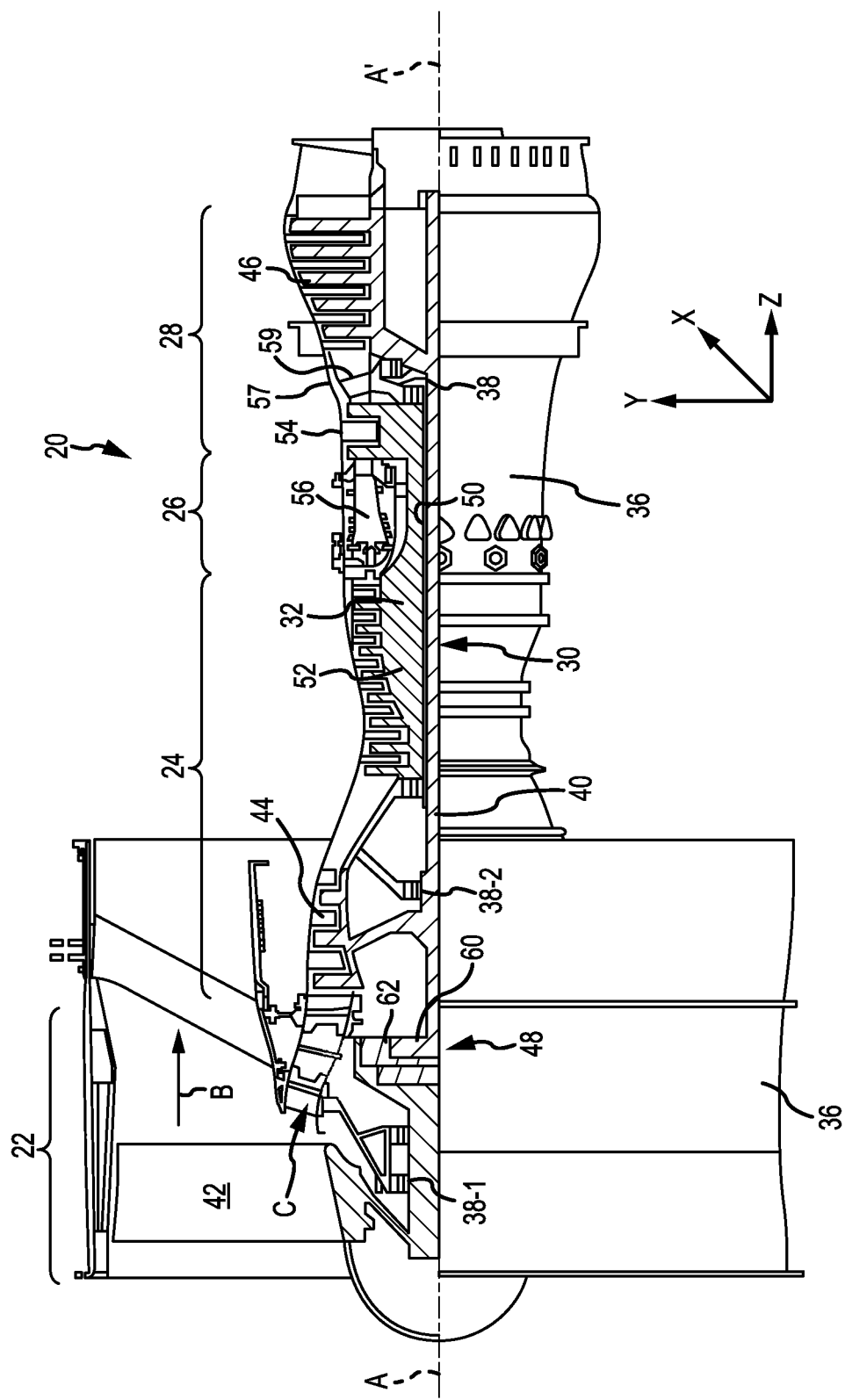
FIG. 1 illustrates an exemplary gas-turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. A mid-turbine frame may also be referred to herein as a non-rotating and/or static structure.

Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
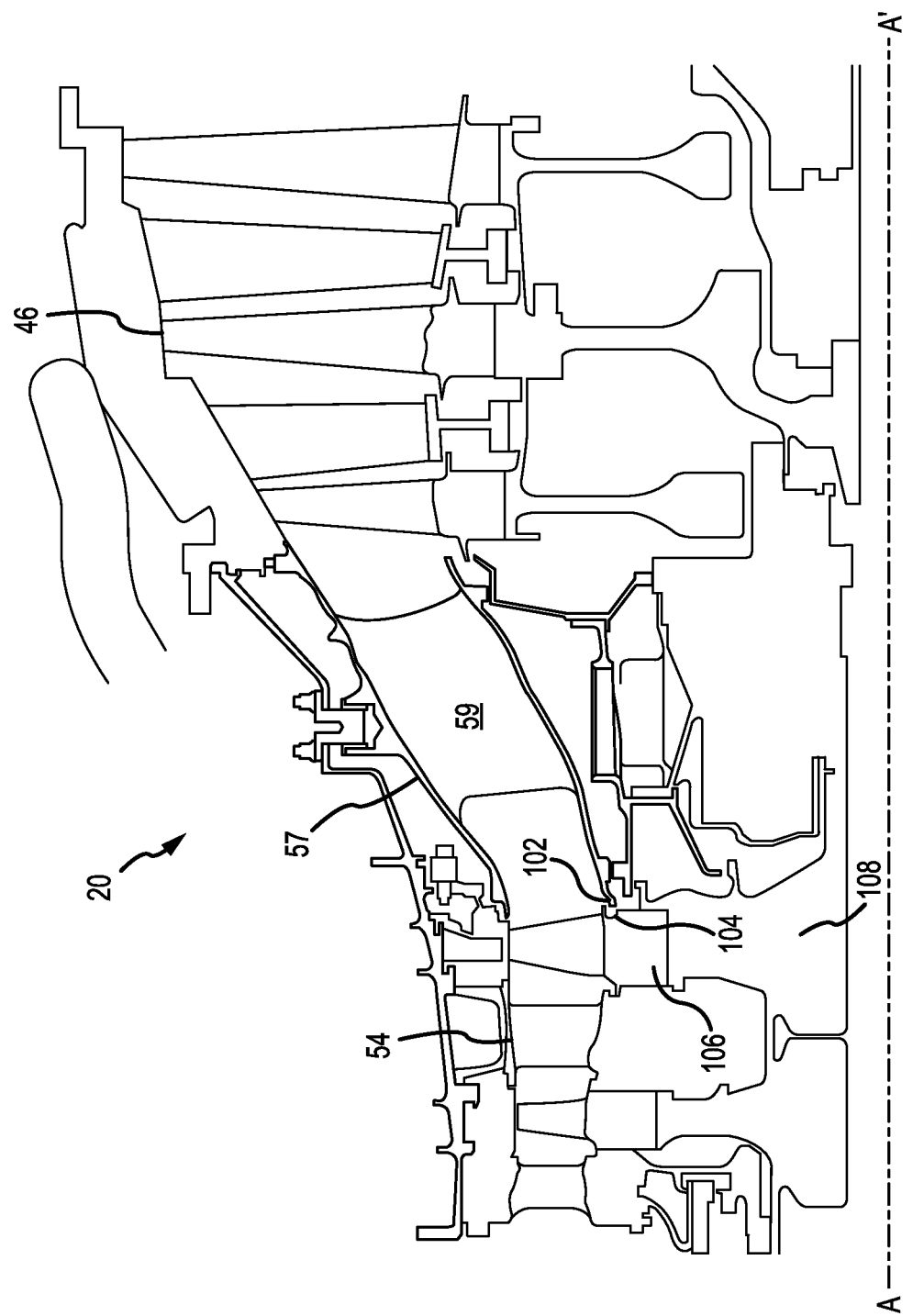
FIG. 2 illustrates an interface between a mid-turbine frame extending into a cavity in a blade platform, in accordance with various embodiments.

With reference to FIG. 2, mid-turbine frame 57 of gas-turbine engine 20 is shown between high-pressure turbine 54 and low-pressure turbine 46 with a vane platform 102 extending into a cavity 104 on a blade platform 106. Vane platform 102 may extend forward from airfoil 59 of mid-turbine frame 57. Cavity 104 of blade platform 106 may open in an aft direction. Cavity 104 may also have a fish-mouth (i.e., "C" shaped) geometry to receive vane platform 102. Blade platform 106 may be coupled to disk 108 and configured to rotate around engine central longitudinal axis A-A'. In that regard, cavity 104 of blade platform 106 may rotate around the engine central longitudinal axis A-A' in proximity to vane platform 102 that does not rotate. The aft-most portions of cavity 104 may overlap radially with the forward-most portion of vane platform 102. Overlap between cavity 104 and vane platform 102 may limit the passage of gas through the space between cavity 104 and vane platform 102.

Figure 3:
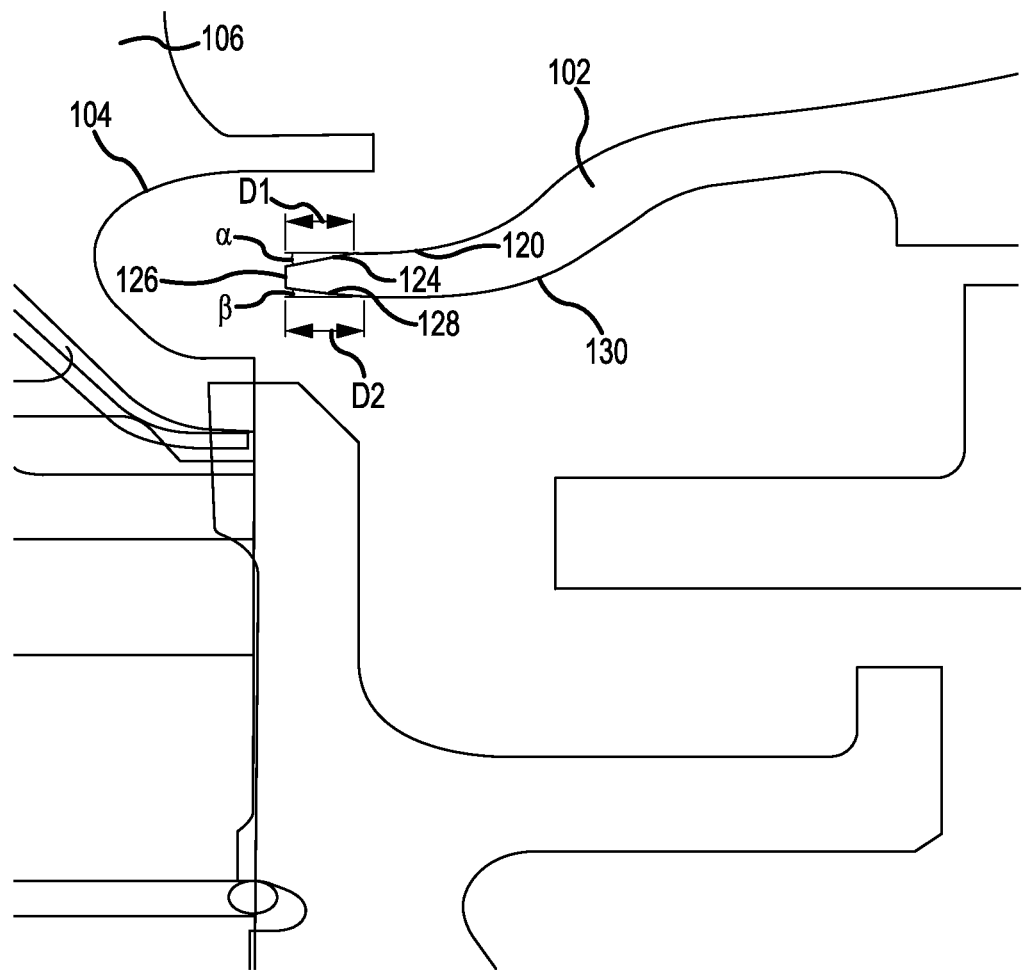
FIG. 3 illustrates a chamfered shape of an interface between a mid-turbine frame and a blade platform, in accordance with various embodiments.

With reference to FIG. 3, a shaped tip 126 of vane platform 102 is shown having a geometry to improve clearance between cavity 104 and vane platform 102 while maintaining radial overlap. During various transient engine conditions, cavity 104 defined by blade platform 106 and vane platform 102 may move relative to one another. A chamfered or rounded geometry of shaped tip 126 may limit contact between vane platform 102 and cavity 104 of blade platform 106.

Figure 5:
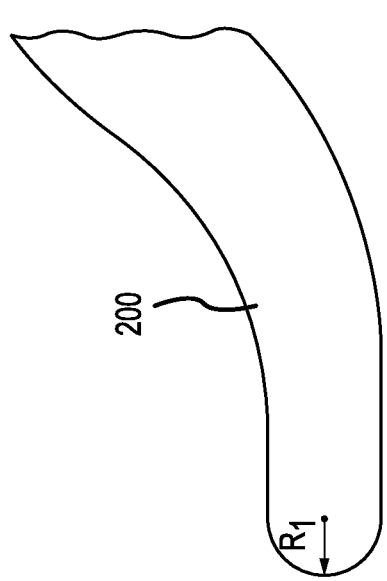
FIG. 5 illustrates a shaped tip of a static component having a radial contour, in accordance with various embodiments.
Figure 6:
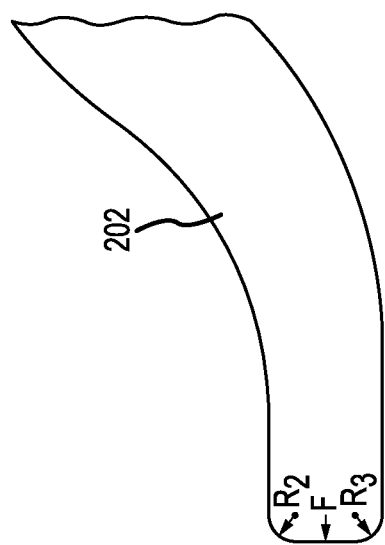
FIG. 6 illustrates a shaped tip of a static component having a partial-radial contour, in accordance with various embodiments.
Figure 7:
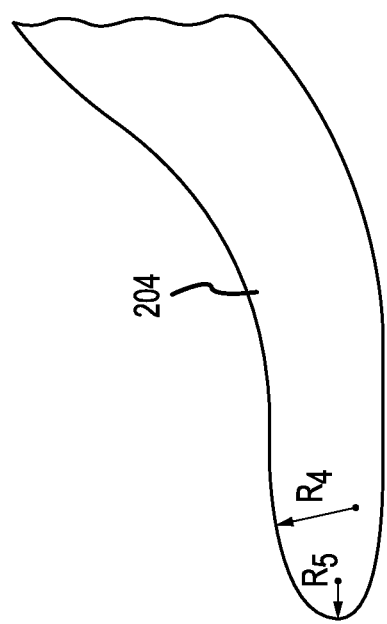
FIG. 7 illustrates a shaped tip of a static component having a multi-radial contour.

In various embodiments, shaped tip 126 may have a chamfered, radial, partial-radial, or multi-radial geometry. For example, shaped tip 200 of FIG. 5 has a radial geometry with radius R1. Shaped tip 202 of FIG. 6 has a partial-radial geometry with radial sections having radius R1 and Radius R2 separated by a flat segment F. Shaped tip 204 has a multi radial geometry with circular segments having at least differing radii labeled radius R4 and radius R5. With continuing reference to FIG. 3, a chamfered geometry of shaped tip 126 may comprise a distal surface 124 proximate distal surface 120 of vane platform 102. Distal surface 124 of shaped tip 126 may be at angle α relative to distal surface 120 of vane platform 102. Angle α may comprise an angle from 5° to 30°, from 10° to 20°, or from 13° to 17° relative to distal surface 120 of vane platform 102. For example, angle α may be 15°. The forward end of shaped tip 126 may comprise a flat or rounded surface to prevent the forward end of shaped tip 126 from causing excessive damage if vane platform 102 contacts cavity 104 of blade platform 106. Distal surface 124 of shaped tip 126 may have a length of D1 in a substantially axial direction from a point where distal surface 124 and distal surface 120 meet to the point where distal surface 124 and forward end of shaped tip 126 meet. The length D1 may be between 0.060 inches and 0.070 inches (1.5 mm to 1.8 mm), for example. Length D1 may vary depending on the application and be between 0.04 inches and 0.2 inches (1.02 mm to 5.08 mm).

In various embodiments, shaped tip 126 may also comprise a proximal surface 128 proximate proximal surface 130 of vane platform 102. Proximal surface 128 may have an angle β relative to proximal surface 130 of vane platform 102. Angle β may comprise an angle from 5° to 30° or from 8° to 12°. Proximal surface 128 may also include a length D2 in a substantially axial direction. Length D2 may be between 0.070 inches and 0.080 inches (1.8 mm to 2.0 mm), for example. Length D2 may vary depending on the application and be between 0.04 inches and 0.2 inches (1.02 mm to 5.08 mm). In various embodiments, the lengths D1 and D2 and the angles α and β of distal surface 124 and proximal surface 128 may be selected to optimize the interface with cavity 104 (e.g., among others, by enabling increased overlap between cavity 104 and vane platform 102 while limiting contact). Shaped tip 126 may be made from an austenitic nickel based superalloy (e.g., the nickel based alloy available under the trademark MAR-M-247). Shaped tip 126 may be made by a machining process (e.g., turning).

Figure 4:
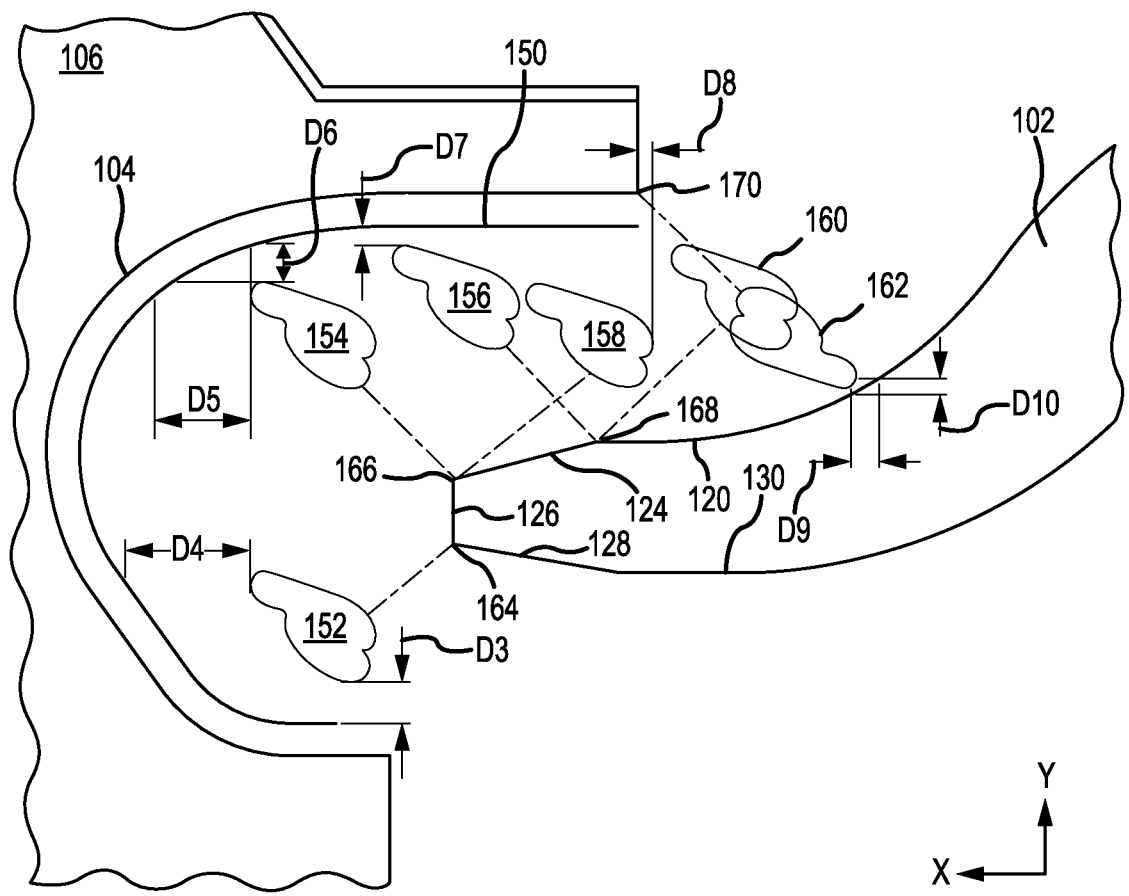
FIG. 4 illustrates the movement of a chamfered static component relative to a cavity on a blade platform during various states of engine operation, in accordance with various embodiments.

With reference to FIG. 4, the positions of various portions of vane platform 102 relative to cavity 104 and blade platform 106 are shown, in accordance with various embodiments. Line 150 shadowing the fish-mouth contour of cavity 104 represents a +/−0.015 inch (0.4 mm) blade cast tolerance that may result in variation in a close position of cavity 104 relative to vane platform 102. During operation of gas-turbine engine 20, vane platform 102 may change position periodically. In that regard, vane platform 102 may assume various positions relative to cavity 104. Peanuts 152 through 162 represent several possible positions of vane platform 102 relative to cavity 104 and may be used to shape vane platform 102 and maintain a predetermined distance from cavity 104.

In various embodiments, peanut 152 may represent the possible positions of point 164 of shaped tip 126 (i.e., the forward end point of proximal surface 128) relative to cavity 104. Point 164 may have a distance of D3 from cavity 104 in a radial direction (i.e., along the y axis). Point 164 may also have a minimum distance of D4 from cavity 104 in an axial direction (i.e., along the x axis). Peanuts 154 and 158 may represent the possible positions of point 166 (i.e., the forward end point of distal surface 124) relative to cavity 104 as vane platform 102 shifts in various directions relative to cavity 104. Distance D5 may represent a minimum distance between point 166 and cavity 104 in an axial direction. Distance D6 may represent a minimum distance between point 166 and cavity 104 in a radial direction. Similarly, distance D8 may signify a maximum axial gap between point 170 on blade platform 106 and point 166 of vane platform 102.

In various embodiments, peanut 156 may represent the possible position of point 168 (i.e., an aft end point of distal surface 124) from cavity 104. Distance D7 may represent a minimum distance between point 168 and cavity 104. Peanut 160 may represent the possible position of point 168 as vane platform 102 shifts in an aft direction relative to blade platform 106. Peanut 162 may represent the distance between point 170 on blade platform 106 and vane platform 102. Distance D9 and distance D10 may be the axial and radial minimum distances, respectively, between point 170 and vane platform 102. Distances D3 through D10 may be minimum distances to be considered in selection of a contour of shaped tip 126 of vane platform 102. For example, distances D3 through D10 may inform the selection of distances D1 and D2 as well as lengths D1 and D2 of shaped tip 126 as illustrated in FIG. 3 to maintain a desired distance from cavity 104 during engine operation.

The chamfered contour of shaped tip 126 may thus partially reflect the fish-mouth contour of cavity 104 defined by blade platform 106. Different contours of cavity 104 may result in a shaped tip 126 having a radial, semi-radial, partial-radial, or chamfered contour with dimensions other than the exemplary dimensions provided herein. In that regard, shaped tip 126 may increase the radial overlap between vane platform 102 and blade platform 106. Increased overlap may result in minimal air leakage between a gas in the gas path and secondary cooling air. Reduced leakage may lead to increased engine efficiency.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas-turbine engine, comprising:
   a turbine comprising an aft blade platform configured to rotate around an axis;
   a static structure aft of the turbine and proximate a cavity defined by the aft blade platform; and
   a vane of the static structure comprising a static vane platform comprising a proximate surface, a distal surface, and a shaped tip, the shaped tip extending into the cavity,
   wherein a proximal surface of the shaped tip extends from a point where the proximal surface of the shaped tip and the proximate surface of the vane platform meet to a point where the proximal surface of the shaped tip and a forward end of the shaped tip meet;
   a distal surface of the shaped tip extends from a point where the distal surface of the shaped tip and the distal surface of the vane platform meet to a point where the distal surface of the shaped tip and the forward end of the shaped tip meet;
   the proximal surface of the shaped tip is disposed at an angle relative to the proximate surface of the vane platform, wherein the angle relative to the proximate surface of the vane platform is between 8 and 12 degrees, and
   the distal surface of the shaped tip is oriented at an angle relative to the distal surface of the vane platform, wherein the angle relative to the distal surface of the vane platform is between 13 and 17 degrees;
   wherein the aft blade platform comprises a distal trailing edge extending aftward from the aft blade platform and at least partially defining the cavity, wherein the distal trailing edge is disposed distal from the cavity, the distal trailing edge and the shaped tip radially overlap, and the distal surface of the shaped tip is disposed entirely forward of the distal trailing edge.

2. The gas-turbine engine of claim 1, wherein the shaped tip comprises a chamfered contour.

3. The gas-turbine engine of claim 1, wherein a length of the distal surface of the shaped tip is between 1.5 mm and 1.8 mm (0.060 inches and 0.070 inches).

4. The gas-turbine engine of claim 3, wherein a length of the proximal surface of the shaped tip is between 1.8 mm and 2 mm (0.070 inches and 0.080 inches).

5. The gas-turbine engine of claim 1, wherein a contour of the shaped tip is configured to maintain a predetermined distance from the cavity.

6. The gas-turbine engine of claim 4, wherein the length of the distal surface of the shaped tip is measured from the point where the distal surface of the shaped tip and the distal surface of the vane platform meet to the point where the distal surface of the shaped tip and the forward end of the shaped tip meet.

7. The gas-turbine engine of claim 6, wherein the length of the proximal surface of the shaped tip is measured from the point where the proximal surface of the shaped tip and the proximate surface of the vane platform meet to the point where the proximal surface of the shaped tip and the forward end of the shaped tip meet.

8. The gas-turbine engine of claim 1, wherein the distal surface of the shaped tip comprises a length measured from the point where the distal surface of the shaped tip and the distal surface of the vane platform meet to the point where the distal surface of the shaped tip and the forward end of the shaped tip meet.

9. The gas-turbine engine of claim 8, wherein the proximal surface of the shaped tip comprises a length measured from the point where the proximal surface of the shaped tip and the proximate surface of the vane platform meet to the point where the proximal surface of the shaped tip and the forward end of the shaped tip meet.

10. The gas-turbine engine of claim 1, wherein the aft blade platform comprises a proximal trailing edge extending aft ward from the aft blade platform and at least partially defining the cavity, wherein the proximal trailing edge is disposed proximal from the cavity.

11. The gas-turbine engine of claim 10, wherein the proximal trailing edge is disposed forward of the distal trailing edge.

12. The gas-turbine engine of claim 1, wherein the shaped tip is made from an austenitic nickel based superalloy.

13. The gas-turbine engine of claim 1, wherein the static structure comprises a mid-turbine frame.

* * * * *